Patented Aug. 25, 1942

2,294,294

UNITED STATES PATENT OFFICE 2,294,294

TREATMENT OF WELLS

John J. Grebe, Midland, Mich., assignor to The Dow Chemical Company, Midland, Mich., a corporation of Michigan No Drawing. Application September 27, 1937, Serial No. 165,895

5 Claims. (Cl. 166—22)

The invention relates to methods of lining well bores and more particularly concerns an improved method of cementing or sealing a casing string or pipe in wells.

In drilling for oil, gas or other fluids, usually many strata are drilled through before the desired productive stratum is reached. It is often the case that some of these strata produce undesirable fluids, as for example, water, when the purpose of the well is to recover oil or gas, or are of such a nature as to cave or slough off into the bore during the drilling operation. It is usual, therefore, to line or case the bore with pipe down to the productive stratum to prevent such infiltration or sloughing. The effectiveness of such casing to prevent infiltration is largely dependent upon whether the space between it and the well bore can be tightly sealed, thus preventing the fluids from overlying strata from flowing down between the outside of the casing and the bore and thence into the well. In conventional practice the casing is generally landed in an impervious stratum and a Portland cement grout is forced into the annular space between the well bore and the casing by placing cement slurry in the casing and forcing it by the application of pressure out of the bottom of the casing up into the space exterior of the casing. After the cement has set, any of it not forced out the lower end of the casing is drilled out leaving the bore open and the casing sealed in an impervious stratum.

Although such cementing practice is widely used, marked difficulties are encountered, mainly because cement does not possess characteristics which wholly adapt it for the purpose. For example, the cement grout is a mixture of solid particles and water in the form of a thick slurry and as such can be made to flow into the small space between the casing and the well bore only by the application of relatively high pumping pressures. Even then complete sealing around the entire diameter of the casing is not assured, because the irregularities of the well bore prevent the cement slurry from completely encircling the casing and the portions of the bore touched by the casing. To overcome this difficulty, it is customary in cementing practice to introduce into the space behind the casing a large volume of the cement grout which, in rising in the annular space to a considerable height, gives some assurance that the casing will be completely encircled with cement at some point. However, as the cement grout assumes an initial set in a relatively short time, usually in about two hours or less, and as the initial set is accelerated by the elevated temperatures encountered in the well bore, it is difficult to introduce a sufficiently large volume of the cement grout into the space behind the casing before it hardens to the extent that it is impossible to pump it. In fact it often happens that the cement grout hardens before it has been properly located, necessitating drilling out the cement left in the casing and repeating the cementing procedure. Another undesirable feature of cement is that dilution with brine or water encountered in some wells often prevents its setting into a hard solid, and even when set it is subject to attack and disintegration by brine so that permanent sealing is not always obtained. Portland cement is also attacked and disintegrated by acids. Since the process of acidizing oil and gas wells with hydrochloric acid has become prevalent, casings cemented with the usual cement have given trouble in that they are in some cases disintegrated and washed away by the action of the acid during the acidization of the well and must be replaced before the well can be produced.

It is therefore an object of the invention to provide a method of sealing a casing or the like in a well bore, whereby an effective seal is produced with a relatively small volume of sealing material.

Another object is to provide a method of sealing a casing or the like in a well bore, whereby a relatively low pressure suffices to force the sealing material into position.

Another object is to provide a method of sealing a casing or the like in a well bore where premature setting of the sealing agent does not occur.

Another object is to provide a method of sealing a casing or the like in a well bore with a liquid capable of transformation into a solid sealing material, the rate of said transformation being susceptible of definite control.

Another object is to provide a method of sealing a casing or the like in the well bore, whereby an effective seal is obtained which is not subject to disintegration by oil, water, brine, or acids.

Still other objects and advantages will become apparent as the description of the invention proceeds.

According to the invention, instead of injecting cement grout into the space exterior of the casing in the well bore, I inject thereinto a mobile resin-forming liquid of the type which by polymerization, addition, or condensation, or like chemical reaction, is transformed into a synthetic resin. Many resin-forming liquids are available which are mobile at ordinary temperatures and are of such a nature that of themselves, or mixed with a suitable catalyst, or when subjected to the action of heat, spontaneously undergo a polymerization or condensation or addition reaction until the whole liquid becomes an insoluble, mechanically strong, solid resin. Such liquids are substantially free from suspended matter and will pass into the finest openings around a casing without difficulty; their time of setting can be delayed for any practical length of time, and after setting form a very strong impermeable resin, insoluble in oil, water, or acids, so that a casing can be readily and permanently sealed in the well bore.

Various resin-forming liquids are suitable for the purpose at hand, the following being some illustrative examples of those which may be used in carrying out the invention.

*Example 1*

Mix together 60 parts of styrene (unpolymerized), 30 parts of oil pitch, and 10 parts of petroleum oil, and then add a suitable catalyst in amount such that the transformation of the liquid mixture into a solid resinous body will occur after a predetermined time. Stannic chloride may be used for this purpose, the amount employed being selected so as to bring about the desired polymerization at a convenient rate. The addition of about 2½ per cent by volume of stannic chloride, based upon the volume of styrene, makes a liquid mixture which is quite fluid and remains so for about 90 minutes at ordinary temperatures. The mixture becomes a very strong resinous solid, insoluble in oil, water, or hydrochloric acid within 10 hours.

*Example 2*

Unpolymerized, or monomeric styrene may be used undiluted and without a catalyst when the temperature at the point the resin-forming liquid is placed is high enough to cause polymerization. At 150° F. the liquid becomes a solid hard resin within 7 days.

*Example 3*

Mix together 70 parts of liquid vinylidene chloride and 30 parts of hexachlordiphenyloxide. When ready for use, add a catalyst mixture of benzoyl peroxide and lead tetraethyl, a suitable amount being 0.5 per cent of benzoyl peroxide and 0.5 per cent lead tetraethyl based upon the volume of vinylidene chloride in the mixture. This resin-forming liquid becomes non-fluid in 2 hours at 110° F. and solid in about 6 hours.

*Example 4*

Petroleum oil is mixed with unpolymerized styrene in amount up to 30 per cent by volume and about 2.0 per cent of stannic chloride, based on the volume of styrene, is added. The function of the petroleum oil is to act as a diluent, reducing the speed of polymerization. With no added oil the mixture of styrene and catalyst alone becomes a solid resin in about 2½ hours at 100° F. When from about 10 to 20 per cent by volume of oil is present, the mixture becomes solid within 18 hours at 100° F., and with 30 per cent oil, the mixture becomes a semi-solid in about 18 hours, and becomes quite solid in about 30 hours.

*Example 5*

Mix together 50 parts vinylidene chloride, 50 parts of hexachlordiphenyloxide then a catalyst mixture of benzoyl peroxide and lead tetraethyl, a suitable amount being 0.25 per cent benzoyl peroxide and 0.2 per cent lead tetraethyl, based on the volume of vinylidene chloride in the mixture. This resin-forming liquid mixture has a specific gravity of about 1.4 and spontaneously undergoes polymerization into an insoluble resinous solid within about 30 hours.

*Example 6*

Mix together 80 parts of unpolymerized styrene, 20 parts of hexachlordiphenyloxide, and about 1.6 per cent stannic chloride, based on the volume of the styrene used. Such a mixture has a specific gravity of 1.15 and will polymerize into a resinous solid in about 16 hours at 100° F.

The foregoing examples are merely illustrative of several resin-forming liquids which may be used according to the invention for sealing or cementing casing strings with a mobile liquid, which forms a solid cementitious deposit, insoluble in water, oil, or hydrochloric acid. Other resin-forming liquids are known, such as certain of the liquid partially condensed phenol-formaldehyde mixtures, vinyl chloride or vinyl esters, such as vinyl acetate. These may be employed similarly according to the invention.

In carrying out the invention in a well for sealing or cementing a casing string, for example, any drilling fluid or other liquid in the well bore is withdrawn, as by bailing, and then an amount of a suitable resin-forming liquid mixture, such as mentioned above, sufficient to fill the space between the well bore and the casing to a desired level is introduced into the well. The casing string, closed at its lower end with a wooden plug, Bakelite cap, or in any similar manner, is then lowered into the well until it reaches the bottom of the bore. The resin-forming liquid, being very fluid, is easily displaced up into the space exterior of the casing. The casing is then allowed to remain in place for the length of time required for the transformation of the resin-forming liquid into a solid resin. After solidification of the resin-forming liquid has occurred, the plug or cap closing the lower end of the casing, together with any solidified resin below it in the bore, is drilled out.

In another mode of carrying out the invention for sealing a casing string in a well in which the infiltration of water into the bore of the well being drilled for the production of hydrocarbons is occurring, the drilling mud in the well bore is preferably first removed therefrom, as by bailing. The casing is then lowered into the well until it reaches a point near the bottom of the bore, and the water flowing into the well is allowed to reach a static level. A water immiscible, resin-forming liquid, the specific gravity of which is adjusted until it is higher than that of the liquid standing in the bore, is introduced into the well in amount sufficient to fill the space exterior of the casing up to the desired level. The resin-forming liquid being heavier will settle to the bottom of the well and displace the other liquids upward in the bore. A suitable liquid, of lower specific gravity than the resin-forming liquid and immiscible therewith, is then introduced into the well through the casing in amount sufficient to displace the resin-forming liquid from the inside of the casing upward into the space between the well bore and the casing. The resin-forming liquid is maintained in this position until solidification has occurred. It is understood, of course, that the resin-forming liquid may be introduced into the well before the casing string is run if desired, and that the latter procedure, employing any of the resin-forming liquids, may be used to seal a casing string when no liquids are flowing into the well bore.

These procedures for sealing a casing string in place may be satisfactorily used providing the surrounding formation is not so porous as to permit excessive loss of the resin-forming liquid thereinto. When the formation is highly porous in nature it may be desirable to first mud it off or plug it in some other manner so as to prevent excessive penetration of the resin-forming liquid into the surrounding earth before proceeding to seal the casing in place.

Leaky or corroded casings may be effectively sealed against the infiltration of fluids by injecting into the space behind the casing at the point where the leak is occurring a resin-forming liquid and allowing it to solidify in situ.

While a catalyst is ordinarily employed to bring about the transformation of the resin-forming liquid into a solid, such transformation may also be produced by heating any of the resin-forming liquids listed above after they have been placed in the well. The liquid in the well may be heated in any suitable manner as by lowering an electrical heating element into the well bore.

By the foregoing method, a casing or the like, can be sealed readily to the bore walls, regardless of its irregularities, whereby infiltration of fluids into the well is prevented. The sealing medium is easily located, is unaffected by brine or water either before or after solidification, and is insoluble in water, oil, and acids when solidified.

Other modes of applying the principle of my invention may be employed instead of those explained, change being made as regards the step or steps herein disclosed, provided the step or steps stated by any of the following claims or the equivalent of such stated step or steps be employed.

I therefore particularly point out and distinctly claim as my invention:

1. In a method of sealing a casing in a well, the steps which consist in forcing into the space between the well bore and the casing a resin-forming liquid capable of spontaneous transformation into a solid resin, and maintaining the liquid in said space until the liquid has set to seal the space with the solid resin.

2. The method of sealing a casing in a well which comprises disposing the casing in the well bore, introducing into the well bore a resin-forming liquid capable of spontaneous transformation into a solid resin, applying pressure to the liquid to force it into the space between the casing and the well bore, and maintaining the pressure upon the liquid until the latter has solidified to seal the said space with the solid resin.

3. The method according to claim 2 in which a catalyst is added to the resin-forming liquid to control the time of set.

4. The method according to claim 2 in which the resin-forming liquid is heated within the well to cause the liquid to set.

5. The method according to claim 2 in which a diluent is added to the resin-forming liquid to control the time of set.

JOHN J. GREBE.